United States Patent
Xiong et al.

(10) Patent No.: US 10,913,155 B2
(45) Date of Patent: Feb. 9, 2021

(54) ROBOT AND METHOD FOR CONTROLLING JOINTS THEREOF

(71) Applicant: UBTECH Robotics Corp, Shenzhen (CN)

(72) Inventors: Youjun Xiong, Shenzhen (CN); Gaobo Huang, Shenzhen (CN); Jiawen Hu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 384 days.

(21) Appl. No.: 16/022,709

(22) Filed: Jun. 29, 2018

(65) Prior Publication Data
US 2019/0193265 A1 Jun. 27, 2019

(30) Foreign Application Priority Data
Dec. 26, 2017 (CN) .......................... 2017 1 1439205

(51) Int. Cl.
*B25J 9/00* (2006.01)
*B25J 9/16* (2006.01)
*B25J 17/02* (2006.01)

(52) U.S. Cl.
CPC ........... *B25J 9/1664* (2013.01); *B25J 9/0009* (2013.01); *B25J 17/0241* (2013.01)

(58) Field of Classification Search
CPC .... B25J 9/1664; B25J 17/0241; B25J 9/0009; G05B 2219/39359
See application file for complete search history.

(56) References Cited

U.S. PATENT DOCUMENTS

| | | | | |
|---|---|---|---|---|
| 2003/0046324 A1* | 3/2003 | Suzuki | ............... | G05B 19/042 718/100 |
| 2004/0133310 A1* | 7/2004 | Watanabe | ........ | G05B 19/41815 700/245 |
| 2009/0308603 A1* | 12/2009 | Borgstadt | .............. | E21B 19/086 166/250.15 |
| 2012/0116582 A1* | 5/2012 | Negishi | ................... | B25J 9/161 700/245 |

FOREIGN PATENT DOCUMENTS

CN 107498555 A 12/2017

OTHER PUBLICATIONS

Xiwei Dong, Design and implementation of AIBO robot dog real-time control system, China Dissertations Database, Mar. 27, 2009, pp. 5 and 19-29, Beijing University of Technology, CN.

* cited by examiner

*Primary Examiner* — Stephen Holwerda (57) ABSTRACT

A robot joint controlling method includes: receiving a motion command; determining one or more joint servos that are needed to execute the motion command; and determining whether the one or more joint servos are in an occupied state, and if not, executing the motion command so as to control the one or more joint servos to operate accordingly.

18 Claims, 5 Drawing Sheets

ROBOT AND METHOD FOR CONTROLLING JOINTS THEREOF

CROSS REFERENCE TO RELATED APPLICATIONS

This application claims priority to Chinese Patent Application No. 201711439205.X, filed Dec. 26, 2017, which is hereby incorporated by reference herein as if set forth in its entirety.

BACKGROUND

1. Technical Field

The present disclosure generally relates to robots, and particularly to a robot and method for con trolling joints thereof.

2. Description of Related Art

With the continuous improvement of mechanical automation, robots are widely used. Typically, a robot controls various parts through joints to perform desired actions. For some robots, the joint motion thereof is controlled in a serial manner. That is, commands for controlling the joint motion are executed one after another, and only one command is executed at a time. A next command will not be executed until a current one has been executed or canceled or an abnormal condition has occurred. These robots do not identify the importance of the to-be-performed actions. When they encounter an emergent situation, they can not respond to it properly. In addition, the serial control of the robot joints limits the flexibility of the robot's limb.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The method for controlling the joint of a robot provided by the present disclosure may be applied to household robots such as seeping robots, robotic arms for use on a production line, robotic arms for performing a cutting process, or bionic robots with bionic structures such as hands, arms, legs, feet and head. By using the method for controlling the joint of a robot, the flexibility of the joint movement can be improved. The method provided by the present disclosure may be applied to, but not limited to the above robots. Automatic mechanical structures having a joint and can control a robot to perform various actions through the joint may be an applicable environment of the method of the present disclosure.

Figure 1:
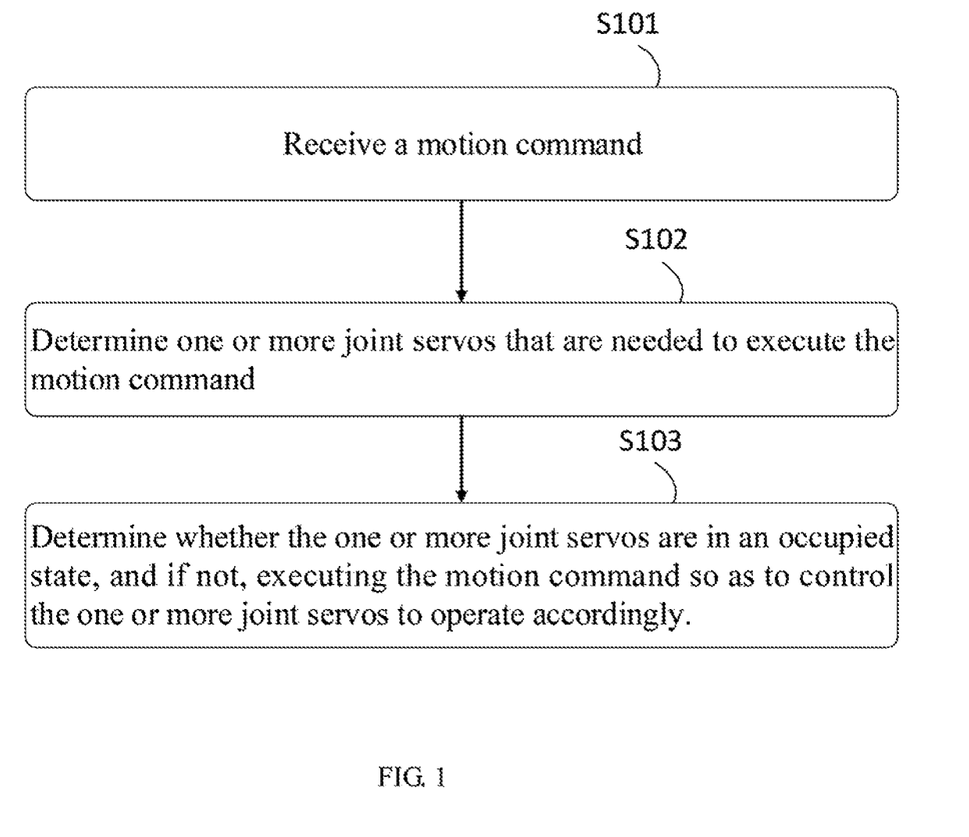
FIG. 1 is a flow chart of a method for controlling a joint of a robot according to a first embodiment.

Referring to FIG. 1, in one embodiment, a method for controlling a robot joint includes the following steps:

Step S101: Receiving a motion command. In the embodiment, to control a robot to perform all the required actions, motion commands corresponding to different actions need to be sent to the robot. The motion commands include information representing different actions. By analyzing the motion commands, the actions corresponding to the motion commands can be obtained.

Step S102: Determining one or more joint servos that are needed to execute the motion command. By analyzing the motion commands, the actions corresponding to the motion commands and the required joint servo(s) can be determined. The joint servos are thus able to drive corresponding joints to move. By controlling the joint servos to drive the corresponding joints, actions corresponding to the motion commands can be achieved.

Step S103: Determining whether the one or more joint servos are in an occupied state, and if not, executing the motion command so as to control the one or more joint servos to operate accordingly. In the embodiment, after determining the one or more joint servos that are needed to execute the motion command, determining further whether the one or more joint servos are in an occupied state. Here, the occupied state refers to that the one or more servos are executing a motion command, while an unoccupied state refers to that the one or more servos are not executing any motion command. In this way, when the joint servo that is needed to execute the motion command is not in the occupied state, it is able to control the joint servo to operate according to the motion command even if the robot having the joint servo is performing actions. This is different from some serially controlled robots that require the robots to complete the current actions before performing subsequent actions, even if the joint servos needed by the subsequent actions are not in the occupied state.

With the above methods, unlike the conventional robots of serial control, the robot of the present disclosure is capable of performing actions corresponding to the motion commands by using the unoccupied joint servos. If a joint servo is not required by two different actions at the same time, the two different actions can then be performed simultaneously, which improves the motion flexibility of the robot.

Figure 2:
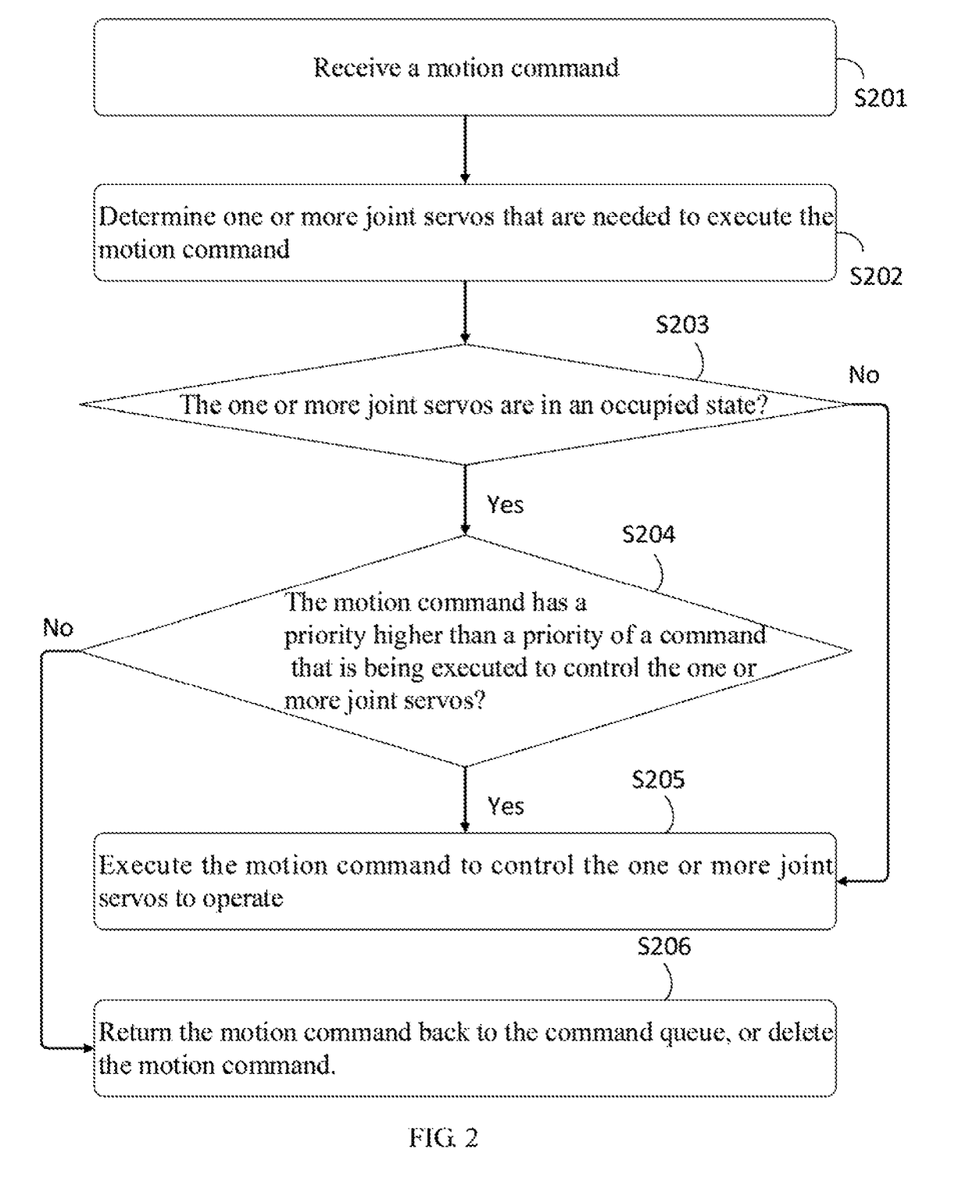
FIG. 2 is a flow chart of a method for controlling a joint of a robot according to a second embodiment.

Referring to FIG. 2, in one embodiment, a method for controlling a robot joint includes the following steps:

Step S201: Receiving a motion command. In the embodiment, to control a robot to perform all the required actions, motion commands corresponding to different actions need to be sent to the robot. The motion commands include information representing different actions, for example, stepping forward, stepping backward, standing still, etc. By analyzing the motion commands, the actions corresponding to the motion commands can be obtained.

In one embodiment, the step S201 includes: establishing a motion command queue and adding the received motion command in the command queue. The command queue comprising a plurality of motion commands that are arranged in order of priority, one of the plurality of motion commands having a highest priority to be executed. If executing the received motion command is not necessary, it may be deleted from the command queue. Since the command queue is usually stored in the control system of the robot, by deleting the unnecessary motion commands in the command queue, the size of the storage occupied by the command queue can be reduced, thereby reducing the burden on the robot control system caused by the storage of the command queue.

It should be noted that the priorities of the motion commands in the command queue are determined by a user according to the actual usage environment. For example, the priority of the motion command corresponding to stepping forward/backward is generally lower than the priority of the motion command corresponding to standing still. In this way, if the robot encounters an obstacle while stepping forward/backward, a motion command corresponding to standing still can be sent to the robot. Since the priority of the motion command corresponding to stepping forward/backward is lower than the priority of the motion command corresponding to standing still, the robot can immediately control the joint servos that are executing the stepping forward/back command to execute the standing still command after receiving the standing still command, such that the robot can stand still when encountering obstacles, rather than continue to step forward/backward. The above is only an example, and a user may determine the priority of each motion commands according to specific usage environment.

It should be noted that the priorities of the motion commands in the command queue may also be flexibly set according to the specific environment, that is, the priority of each motion command may be not constant depending on their actual application environments. For example, if the robot encounters an obstacle and then the obstacle is removed, the priority of the motion command corresponding to stepping forward/backward needs to be adjusted to be higher than, the priority of the motion command corresponding to standing still, such that the robot can continue to step forward/backward after the obstacle is cleared.

Step S202: Determining one or more joint servos that are needed to execute the motion command. By analyzing the motion commands, the actions corresponding to the motion commands and the required joint servo(s) can be determined. The joint servos are thus able to drive corresponding joints to move. By controlling the joint servos to drive the corresponding joints, actions corresponding to the motion commands can be achieved. It should be noted that the motion command comes from the command queue.

Each joint servo corresponds to a robot joint. For example, a first servo joint drives the robot head to rotate vertically, and a second servo joint drives the robot head to rotate horizontally. A third servo joint drives the joint for the left arm to rotate forward/backward, and a fourth servo joint drives the joint for the right arm to rotate forward/backward. It should be noted that there may other joint servos according to need. One joint may correspond to different joint servos to drive it to perform different actions. For example, the head joint corresponds to joint servos for driving it to rotate vertically and horizontally.

Step S203: Determining whether the one or more joint servos are in an occupied state. In the embodiment, determining whether the one or more joint servos are in an occupied state after determining the required one or more joint servos. Here, the occupied state refers to that the one or more servos are executing a motion command. If the one or more joint servos are in an occupied state, the process goes to step S204, otherwise, the process goes to step S205.

Step S204: Determining if the motion command has a priority higher than a priority of a command that is being executed to control the one or more joint servos. In the embodiment, when the one or more joint servos are in an occupied state, it needs to determine if the motion command has a priority higher than a priority of a command that is being executed to control the one or more joint servos. If yes, the process goes to step S205, otherwise, the process goes to step S206.

Step S205: Executing the motion command to control the one or more joint servos to operate. In the embodiment, when the one or more joint servos are not in an occupied state, the one or more joint servos will operate as controlled by the execution of the motion command. Unlike the conventional serial control that requires a next action to be performed after a current one has been finished even if the next action requires a joint servo that is not in an occupied state, the method of the present embodiment determines if the required one or more joint servos are in an occupied state, and controls the unoccupied one or more joint servos to operate for required actions, which improves the motion flexibility of the robot.

In one embodiment, the execution of the motion command for controlling the one or more joint servos to operate includes: acquiring motion parameters corresponding to the execution of the motion command, and controlling the one or more joint servos to operate according to the motion parameters, and setting one or more joint servos to an occupied state. After the one or more joint servos have operated as controlled by the motion command or the operation of the one or more joint servos have been terminated due to an abnormal situation, the one or more joint servos are adjusted back to an unoccupied state and the adjustment is reported to the control system of the robot.

In one embodiment, the motion parameters include angle of motion, motion distance, direction of motion, and motion time. Specifically, it needs to acquire angle of motion, direction of motion and motion time such that a joint servo is capable of driving its corresponding joint to perform required rotation. The joint servo is capable of driving the corresponding joint to rotate toward a required direction for a required angle at a required speed according to these parameters, such that the required action, such as horizontal/vertical rotation of a robot head, can be performed. Or it needs to acquire motion distance, motion direction and motion time when the joint servo drives its corresponding joint to move linearly toward a required direction for a required distance at a required speed calculated according to the acquired motion distance and motion time. The action performed by a joint driven by one or more joint servos can be a combination of the above-mentioned rotational motion and linear motion. The one or more joint servos are capable of driving the corresponding joint to perform a required action after acquire corresponding motion parameters.

Step S206: Returning the motion command back to the command queue, or deleting the motion command. In the embodiment, when the one or more joint servos are in an occupied state and the received motion command has a priority lower than a priority of a command that is being executed to control the one or more joint servos, the one or more joint servos need to continue to operate according to the currently executed command, and the received motion command will be sent back to the command queue. After execution of the current command is completed, the returned motion command will be executed. Or if executing the received motion command is not necessary, it can be deleted from the command queue so as to save storage.

Figure 3:
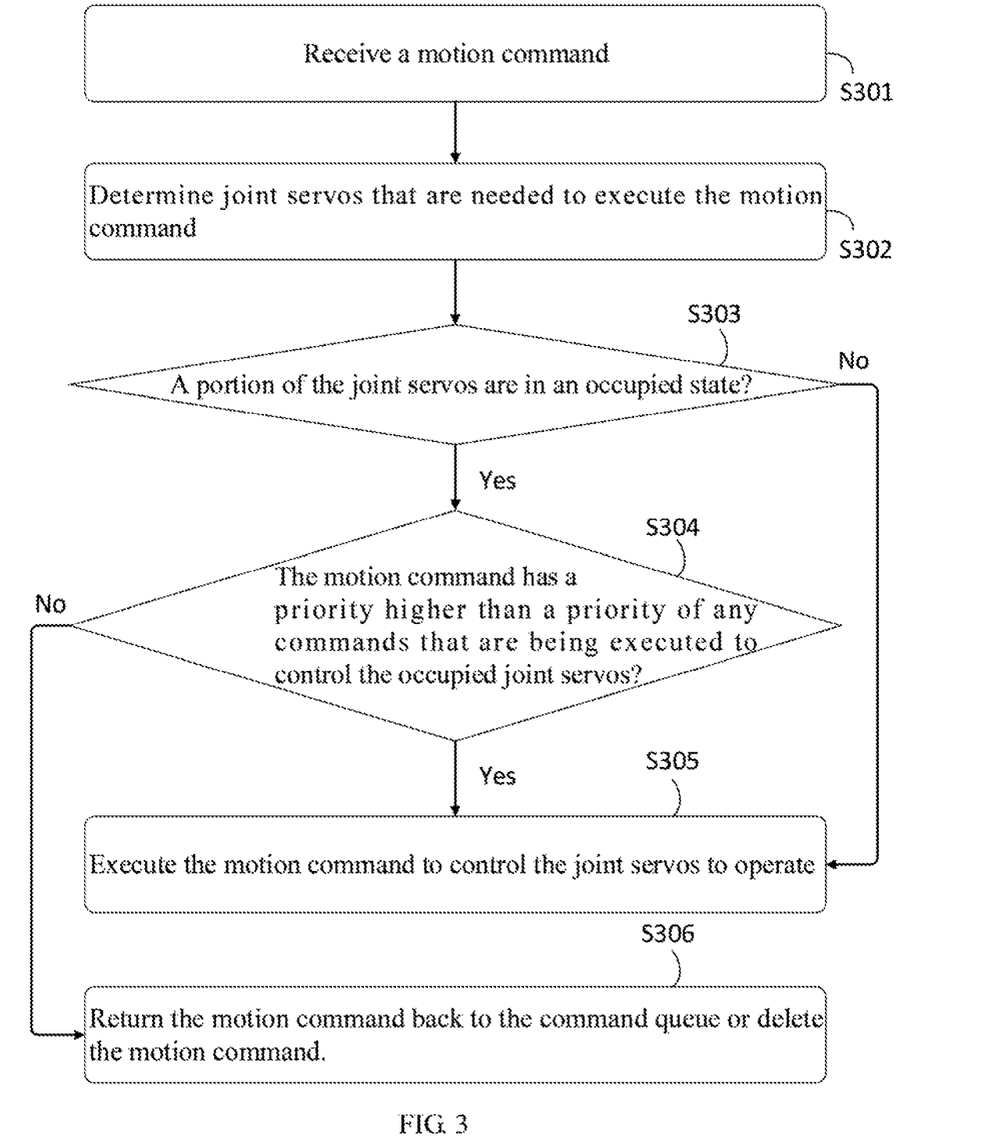
FIG. 3 is a flow chart of a method for controlling a joint of a robot according to a third embodiment.

Referring to FIG. 3, in one embodiment, a method for controlling a robot joint includes the following steps:

Step S301: Receiving a motion command. In the embodiment, to control a robot to perform all the required actions, motion commands corresponding to different actions need to be sent to the robot. The motion commands include information representing different actions, for example, stepping forward, stepping backward, standing still, etc. By analyzing the motion commands, the actions corresponding to the motion commands can be obtained.

In one embodiment, the step S301 includes: establishing a motion command queue, and adding the received motion command in the command queue. The command queue comprising a plurality of commands that are arranged in order of priority, one of the plurality of commands having a highest priority to be executed. If executing the received motion command is not necessary, it may be deleted from the command queue. Since the command queue is usually stored in the control system of the robot, by deleting the unnecessary motion commands in the command queue, the size of the storage occupied by the command queue can be reduced, thereby reducing the burden on the robot control system caused by the storage of the command queue.

Step S302: Determining a number of joint servos that are needed to execute the motion command. By analyzing the motion commands, the actions corresponding to the motion commands and the required joint servos can be determined. The joint servos are thus able to drive corresponding joints to move. By controlling the joint servos to drive the corresponding joints, actions corresponding to the motion commands can be achieved. It should be noted that the motion command comes from the command queue.

Step S303: Determining if part of the joint servos are in an occupied state. In the embodiment, determining whether the joint servos are in an occupied state after determining the required joint servos. Here, the occupied state refers to that the joint servos are executing a motion command. If part of the joint servos are in an occupied state, the process goes to step S304, otherwise, the process goes to step S305.

Step S304: Determining if the motion command has a priority higher than a priority of any commands that are being executed to control the occupied joint servos. If yes, the process goes to Step S305, otherwise, the process goes to Step S306.

Step S305: Executing the motion command so as to control the joint servos to operate accordingly. In the embodiment, if the joint servos that are needed to execute the motion command are not in an occupied state, then executing the motion command so as to control the joint servos to operate accordingly. If part of the joint servos that are needed to execute the motion command are not in an occupied state and the motion command has a priority higher than a priority of any commands that are being executed to control the occupied joint servos, then suspending the execution of the commands that are being executed to control the occupied joint servos and executing the motion command so as to control the joint servos to operate accordingly.

In one embodiment, the execution of the motion command for controlling the joint servos to operate includes: acquiring motion parameters corresponding to the execution of the motion command, and controlling the one or more joint servos to operate according to the motion parameters, and setting one or more joint servos to an occupied state.

After the one or more joint servos have operated as controlled by the motion command or the operation of the one or more joint servos have been terminated due to an abnormal situation, the one or more joint servos are adjusted back to an unoccupied state and the adjustment is reported to the control system of the robot.

Step S306: Returning the motion command back to the command queue, or deleting the motion command. In the embodiment, when part of the joint servos are in an occupied state and the motion command has a priority lower than a priority of a command that is being executed to control the occupied joint servos, the joint servos need to continue to operate according to the currently executed command, and the received motion command will be sent back to the command queue. After execution of the current command is completed, the returned motion command will be executed. If executing the received motion command is not necessary, it can be deleted from the command queue so as to save storage.

In summary, the method of the above embodiment includes: receiving a motion command, acquiring a number of joint servos that are needed to execute the motion command, determining if the joint servos are in an occupied state, and executing the motion command to control the joint servos to operate accordingly when all the joint servos are not in an occupied state. If part of the joint servos are in an occupied state, determining if the motion command has a priority higher than a priority of any commands that are being executed to control the occupied joint servos. If yes, which means that the motion command corresponds to an action that is more important than the action that is being performed by the occupied joint servos, then executing the motion command to control the joint servos to operate accordingly. With such a method, unlike the conventional robots of serial control, the robot of the present disclosure is capable of performing actions corresponding to the motion commands by using the unoccupied joint servos. If a joint servo is not required by two different actions at the same time, the two different actions can then be performed simultaneously. If a joint servo is required by two different actions at the same time, the action having a higher priority will be performed, which improves the motion flexibility of the robot.

Figure 4:
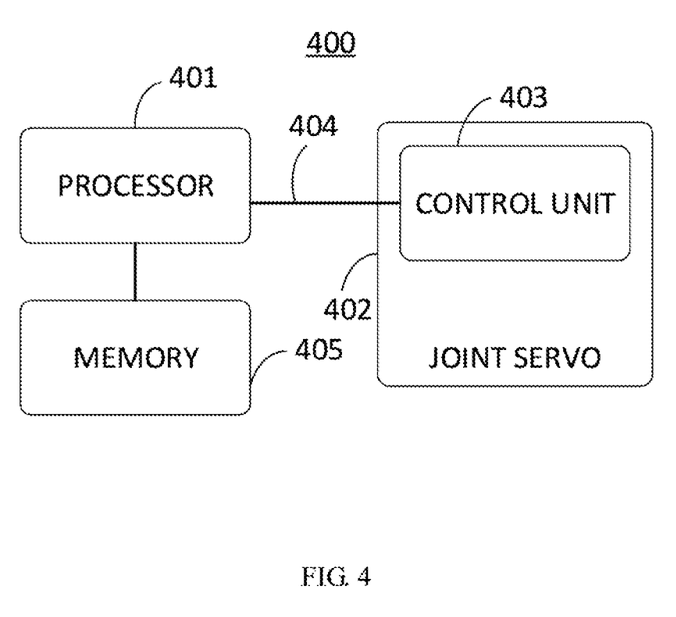
FIG. 4 is a schematic block diagram of a robot according to one embodiment.

Referring to FIG. 4, in one embodiment, a robot 400 includes a processor 401, a plurality of independent joint servos 402 each having its own occupied state and unoccupied state, and electrically coupled to the processor 401 and a memory 405 storing a number of programs. The processor 401 can execute the one or more programs to: receive a motion command; determine one or more of the joint servos 402 that are needed to execute the motion command; and determine whether the one or more of the joint servos 402 are in an occupied state; and if not, execute the motion command so as to control the one or more of the joint servos 402 to operate accordingly; otherwise, determine if the motion command has a priority higher than the priority of the command that is being executed to control the occupied joint servo 402; if yes, execute the motion command so as to control the one or more of the joint servos 402 to operate accordingly. It should be noted that the processor 401 can execute one or more programs to implement any method as described above.

In one embodiment, each of the joint servos 402 includes a control unit 403 that is electrically coupled to the processor 401 through a CAN bus 404. The processor 401 sends motion parameters corresponding to the execution of the motion command to the control unit 403 via the CAN bus 404, thereby enabling the control unit 403 to control the joint servo 402 according to the motion parameters. After the joint servo 402 has finished the required operation, the control unit 403 will notify the processor 401 via the CAN bus 404 about this, such that the processor 401 can monitor the state of the joint servo 402.

Figure 5:
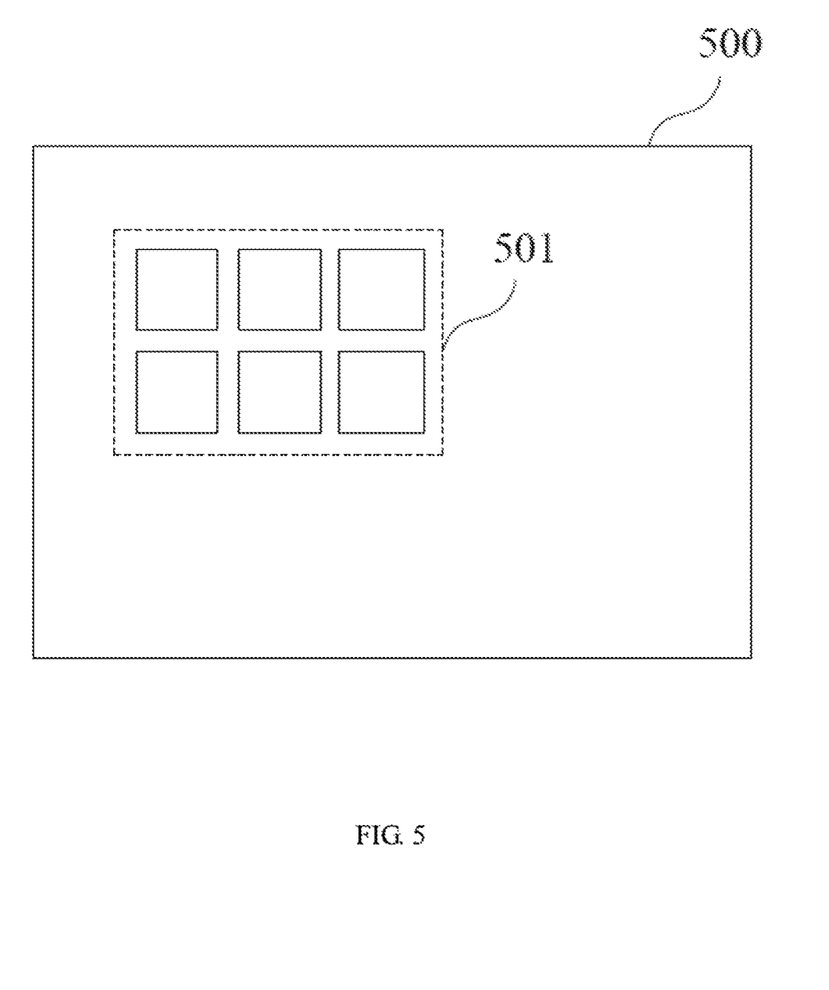
FIG. 5 is a schematic block diagram of a computer readable storage medium to one embodiment.

Referring to FIG. 5, in one embodiment, a non-transitory computer-readable storage medium 500 stores one or more programs that are executable by one or more processors 501 of a robot. The one or more processors 501 are capable of executing the one or more programs to implement any method as described above.

It should be understood that, according to the embodiments of the present disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or may not be separated physically. The components shown as units may be or may not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure or the part of the disclosure that contributes to conventional technologies or past of the technical solutions may be embodied in the form of a software product. The computer software product is stored in a storage medium and includes several instructions for instructing a computer device (which may be a personal computer, a server, a network, device or the like) or a processor to implement all of or part of the steps of the methods according to the embodiments of the disclosure. The foregoing storage medium includes various media that can store programs, for example, USB disks, mobile hard disk drives, read-only memories (ROMs), random access memories (RAMs), magnetic disks, optical disks and the like.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented robot joint controlling method, executed on a processor, comprising:
    establishing a motion command queue, wherein the motion command queue comprises a plurality of motion commands that are arranged in order of priority, and one of the plurality of motion commands having a highest priority to be executed;
    adding a received motion command in the command queue;
    determining one or more joint servos which are needed to execute the motion command;
    determining whether the one or more joint servos are in an occupied state, and executing the motion command so as to control the one or more joint servos to operate accordingly if the one or more joint servos are not in an occupied state; and
    upon the condition that the one or more joint servos are in an occupied state, determining if the received motion command has a priority higher than a priority of a motion command that is being executed to control the one or more joint servos, and if so, executing the received motion command so as to control the one or more joint servos to operate accordingly.

2. The method of claim 1, further comprising:
    upon the condition that the received motion command needs more than one joint servos, and part of which are in an occupied state, determining if the received motion command has a priority higher than a priority of any motion commands that are being executed to control the occupied joint servos, if so, executing the received motion command so as to control the one or more joint servos to operate accordingly.

3. The method of claim 2, further comprising:
    upon the condition that the priority of the received motion command is lower than a priority of any motion commands that are being executed to control the occupied joint servos, returning the received motion command back to the command queue, or deleting the received motion command.

4. The method of claim 1, wherein the "executing the motion command so as to control the one or more joint servos to operate accordingly" further comprises:
    acquiring motion parameters corresponding to the execution of the motion command, and controlling the one or more joint servos to operate according to the motion parameters, and setting the one or more joint servos to an occupied state, and the motion parameters comprise angle of motion, motion distance, direction of motion, and motion time.

5. The method of claim 1 further comprising:
    setting the one or more joint servos to an unoccupied state after the execution of the motion command is completed.

6. A robot comprising:
    a plurality of independent joint servos each having its own occupied state and unoccupied state;
    one or more processors electrically coupled to the joint servos;
    a memory; and
    one or more programs, wherein the one or more programs are stored in the memory and configured to be executed by the one or more processors, the one or more programs comprises:
    instructions for establishing a motion command queue, wherein the motion command queue comprises a plurality of motion commands that are arranged in order of priority, and one of the plurality of motion commands having a highest priority to be executed;

instructions for adding a received motion command in the command queue;

instructions for receiving a motion command;

instructions for determining one or more of the joint servos that are needed to execute the motion command;

instructions for determining whether the one or more of the joint servos are in an occupied state, and if not, executing the motion command so as to control the one or more of the joint servos to operate accordingly; and instructions for determining if the received motion command has a priority higher than a priority of a motion command that is being executed to control the one or more joint servos, upon the condition that the one or more joint servos are in an occupied state, and if so, executing the received motion command so as to control the one or more joint servos to operate accordingly.

7. The robot of claim 6, wherein each of the joint servos comprises a control unit, the control unit is electrically coupled to the one or more processors through a CAN bus, the one or more processors send motion parameters corresponding to the execution of the motion command to the control unit via the CAN bus, thereby enabling the control unit to control the joint servo according to the motion parameters.

8. The robot of claim 6, wherein the one or more programs further comprises instructions for establishing a motion command queue, each motion command in the motion command queue has a priority parameter, and is to be executed according to the priority parameter.

9. The robot of claim 6, wherein the one or more programs further comprises instructions for:

upon the condition that the received motion command needs more than one joint servos, and part of which are in an occupied state, determining if the received motion command has a priority higher than a priority of any motion commands that are being executed to control the occupied joint servos, if so, executing the received motion command so as to control the one or more joint servos to operate accordingly.

10. The robot of claim 9, wherein the one or more programs further comprises instructions for:

upon the condition that the priority of the received motion command is lower than a priority of any motion commands that are being executed to control the occupied joint servos, returning the received motion command back to the command queue, or deleting the received motion command.

11. The robot of claim 6, wherein the "executing the motion command so as to control the one or more joint servos to operate accordingly" further comprises:

acquiring motion parameters corresponding to the execution of the motion command, and controlling the one or more joint servos to operate according to the motion parameters, and setting the one or more joint servos to an occupied state, and the motion parameters comprise angle of motion, motion distance, direction of motion, and motion time.

12. The robot of claim 6, wherein the one or more programs further comprises instructions for:

setting the one or more joint servos to an unoccupied state after the execution of the motion command is completed.

13. A non-transitory computer-readable storage medium storing one or more programs to be executed in a robot, the one or more programs, when being executed by one or more processors of the robot, causing the robot to perform processing comprising:

establishing a motion command queue, wherein the motion command queue comprises a plurality of motion commands that are arranged in order of priority, and one of the plurality of motion commands having a highest priority to be executed;

adding a received motion command in the command queue;

determining one or more joint servos that are needed to execute the motion command;

determining whether the one or more joint servos are in an occupied state, and if not, executing the motion command so as to control the one or more joint servos to operate accordingly; and determining if the received motion command has a priority higher than a priority of a motion command that is being executed to control the one or more joint servos, upon the condition that the one or more joint servos are in an occupied state, and if so, executing the received motion command so as to control the one or more joint servos to operate accordingly.

14. The non-transitory computer-readable storage medium of claim 13, wherein the "receiving a motion command" comprises:

establishing a motion command queue, and adding the received motion command in the command queue; each motion command in the motion command queue has a priority parameter, and is to be executed according to the priority parameter.

15. The non-transitory computer-readable storage medium of claim 13, wherein the one or more programs, when being executed by one or more processors of the robot, causing the robot to perform processing comprising:

upon the condition that the received motion command needs more than one joint servos, and part of which are in an occupied state, determining if the received motion command has a priority higher than a priority of any motion commands that are being executed to control the occupied joint servos, if so, executing the received motion command so as to control the one or more joint servos to operate accordingly.

16. The non-transitory computer-readable storage medium of claim 15, wherein the one or more programs, when being executed by one or more processors of the robot, causing the robot to perform processing comprising:

upon the condition that the priority of the received motion command is lower than a priority of any motion commands that are being executed to control the occupied joint servos, returning the received motion command back to the command queue, or deleting the received motion command.

17. The non-transitory computer-readable storage medium of claim 13, wherein the "executing the motion command so as to control the one or more joint servos to operate accordingly" further comprises:

acquiring motion parameters corresponding to the execution of the motion command, and controlling the one or more joint servos to operate according to the motion parameters, and setting the one or more joint servos to an occupied state, and the motion parameters comprise angle of motion, motion distance, direction of motion, and motion time.

18. The non-transitory computer-readable storage medium of claim 13, wherein the one or more programs, when being executed by one or more processors of the robot, causing the robot to perform processing comprising:
 setting the one or more joint servos to an unoccupied state after the execution of the motion command is completed.

\* \* \* \* \*